Patented May 3, 1932

1,856,206

UNITED STATES PATENT OFFICE

MICHAEL J. BRIDGMAN, OF JEROME, IDAHO

METHOD OF MAKING FOOD COMPOUNDS

No Drawing.   Application filed April 9, 1929.   Serial No. 353,900.

My invention relates to the production of a food compound, and particularly a syrup for table use.

The primary object of the invention is to produce the syrup consisting of pure liquid honey and butter, and compounding and mixing the ingredients in such manner that the same will be thoroughly homogenized in such manner as to become an inseparable compound.

The compound consists of a mixture of pure liquid honey and butter, the proportion of honey being considerably greater than the butter. Preferably, the mixture consists of liquid honey of 92% and pure creamery butter of 8%. The mixture in these proportions is warmed or heated to approximately 150° Fahrenheit, after which and while still heated the mixture is subjected to a mixing process to thoroughly combine and homogenize these ingredients. A thorough admixture of the ingredients to preclude separation after cooling is obtained only by subjecting the mixture to a mixing process involving a high degree of pressure. In accomplishing this, use is made of standard equipment for the mixing of ingredients under pressure, which usually consists in a cylinder having a very small opening or openings therein through which the mixture is forced under pressure of approximately three thousand pounds per square inch.

The product made in accordance with this formula and process is a free flowing syrup adaptable for table use and particularly in connection with griddle cakes, waffles, etc. It has been found that the production of honey and butter in the proportion stated will remain completely homogenized and the ingredients are incapable of separation after becoming cool or when extremely cold. The mixture thus produced may be canned, or bottled for market, and will be found thoroughly mixed and inseparable regardless of the time it has remained canned or bottled.

It will be understood that instead of butter substitutes therefor may be used, in fact, any analogous fats may be mixed and thoroughly homogenized with pure liquid honey in accordance with the foregoing process.

Having thus described my invention, I claim:

A process of homogenizing honey and butter to form a free flowing syrup, which consists in heating a mixture of approximately 92% of pure liquid honey and 8% creamery butter to a temperature of approximately 150° Fahrenheit and then passing the mixture through a mixer at approximately three thousand pounds pressure.

In testimony whereof I hereby affix my signature.

MICHAEL J. BRIDGMAN.